United States Patent [19]
Boyle

[11] Patent Number: 5,475,745
[45] Date of Patent: Dec. 12, 1995

[54] ABANDONED CALL CONTROL AND INDICATION

[75] Inventor: Stephen J. Boyle, Ottawa, Canada

[73] Assignee: Mitel Corporation, Ontario, Canada

[21] Appl. No.: 755,488

[22] Filed: Sep. 4, 1991

[30] Foreign Application Priority Data

Jul. 31, 1991 [CA] Canada ................................. 2048217

[51] Int. Cl.⁶ ........................... H04M 3/42; H04M 11/04; H04M 1/64
[52] U.S. Cl. ............................... 379/201; 379/45; 379/67; 379/204
[58] Field of Search ..................... 379/34, 45, 67, 379/88, 201, 217, 203, 204, 205, 249

[56] References Cited

U.S. PATENT DOCUMENTS

| | | | |
|---|---|---|---|
| 3,902,021 | 8/1975 | Walker | 379/249 |
| 4,540,850 | 9/1985 | Herr et al. | 379/204 |
| 4,653,090 | 3/1987 | Hayden | 379/204 |
| 4,924,491 | 5/1990 | Compton et al. | 379/45 |
| 5,095,504 | 3/1992 | Nishikawa et al. | 379/201 |

FOREIGN PATENT DOCUMENTS

| | | | |
|---|---|---|---|
| 0154865 | 9/1984 | Japan | 379/201 |
| 2082420 | 3/1982 | United Kingdom . | |

Primary Examiner—James L. Dwyer
Assistant Examiner—Harry S. Hong
Attorney, Agent, or Firm—Antonelli, Terry, Stout & Kraus

[57] ABSTRACT

A method and apparatus for holding a line busy from which a party has disconnected and providing an indication to the other party that the first party has hung up. The invention operates by receiving a call in a telephone switching office from a first subscriber on an incoming line destined for a second subscriber, storing an indication signal signifying that the call has been received; in case the first subscriber has hung up, accessing the indication signal, and as a result sending a signal to the second subscriber which is indicative that the first subscriber has hung up. Such systems are useful in emergency call handling systems, such as 911 emergency call systems.

12 Claims, 1 Drawing Sheet

5,475,745

ABANDONED CALL CONTROL AND INDICATION

FIELD OF THE INVENTION

This invention relates to telephone switching systems, and to a method and apparatus for holding a line busy from which a party has disconnected and providing an indication to the other party that the first party has hung up. Such systems are useful in emergency call handling systems, such as 911 emergency call systems.

BACKGROUND TO THE INVENTION:

When a party initiating a call to an incoming trunk hangs up, the incoming trunk is disconnected. When a trunk has been placed on hold, and the party at the far end of the trunk disconnects, the trunk is also dropped. This presents a significant problem to an operator of an emergency call system, referred to below as a 911 call system, because if a calling party in difficulty disconnects before the operator can answer the call, with the incoming trunk dropped, the operator has no way of knowing from what line the emergency call has been made.

If a call has been made either incoming, or outgoing from an operator, and the operator wishes to retain the emergency call while he summons an emergency service such as the police, the fire department, etc., he normally places the call on hold in order that he could use the same telephone instrument to call the emergency service. If the party in difficulty hangs up while on hold, the operator, in retrieving the call has no way of knowing whether the other party has hung up or is merely silent, for example due to some traumatic event.

For the above reasons, it is important for the operator to know whether the party in difficulty has in fact hung up, and preferably to know what was the identification of that incoming call. Without such information, it is not possible to adequately respond to certain types of emergency calls.

SUMMARY OF THE INVENTION

The present invention provides a method and means for identifying that an incoming call has in fact occurred, in the preferable case in which automatic incoming call identification is provided, to provide an identification of the incoming line, and in the case of calls not yet answered or a call in progress or a call in progress in which the operator has placed the other call on hold, to identify the fact that the subscriber at the far end of the trunk has hung up.

According to the present invention an incoming call can be held up when the line or trunk disconnects before the terminator has answered; an audible indication such as a tone is provided to the operator indicating that the originator has disconnected.

The present invention also provides the ability to hold up a line or trunk call when the line or trunk disconnects while on soft or hard hold, and an audible indication such as a tone is provided to the operator indicating that the held party has disconnected.

While the signal to the operator can be a tone, it could alternatively or in addition be a message for display on an operator display, and the message can include an identification of the calling line if the system accommodates automatic incoming call identification. Automatic incoming call identification provides data to a called line which identifies the number of a calling line. The identification to the operator can include the automatic lookup of a calling line address or region based on the automatic call identification as is currently used with some 911 emergency call systems.

In accordance with the present invention, a method of handling telephone calls is comprised of the steps of receiving a call in a telephone switching office from a first subscriber on an incoming line or trunk destined for a second subscriber, storing an indication signal signifying that the call has been received on a particular line or trunk in case the first subscriber has hung up, accessing the indication signal, and as a result sending a signal to the second subscriber which is indicative that the first subscriber has hung up.

In accordance with another embodiment, the further steps are included of automatically holding the incoming line or trunk after the first subscriber has hung up, and releasing the incoming line or trunk upon sending the indicative signal to the second subscriber that the first subscriber has hung up.

In accordance with another embodiment, included is the step of holding the incoming line or trunk in the case in which the first subscriber has hung up prior to the second subscriber answering the call.

According to another embodiment, the step is included of holding the incoming line or trunk in the case in which the second subscriber has answered the call, placed the incoming line or trunk on hold, and subsequently attempted to release the incoming line or trunk from hold, and sending the indicative signal to the second subscriber indicative that the first subscriber has hung up after the incoming line or trunk has been attempted to be released from hold, and releasing the incoming line or trunk from hold only after the second subscriber has attempted to release the incoming line or trunk from hold and the indicative signal has been sent.

In accordance with another embodiment, a method of handling telephone calls is comprised of processing a call in a telephone switching office from a first subscriber on an incoming line or trunk, destined for a second subscriber on an outgoing line or trunk, storing an indication signal that the call is being processed via a particular outgoing line or trunk, automatically holding the particular outgoing line or trunk in case the second subscriber has hung up, sending a signal to the first subscriber indicative that the second subscriber has hung up, and then releasing the outgoing line or trunk.

In accordance with another embodiment, a telephone switching apparatus is comprised of at least one peripheral controller, line and trunk circuits controlled by the peripheral controller, a central control for controlling the apparatus including controlling the peripheral controller and switching of signals between line circuits and/or line and trunk circuits to enable calls to be made between lines and/or lines and trunks, a random access memory (RAM) connected to the central control for storage of first signals indicative of predetermined lines and/or trunks designated as abandoned call handling (ACH) lines and/or trunks and for storage of signals indicative of the active state of the ACH lines and/or trunks, a second random access memory (RAM) connected to each peripheral controller for storage of second signals indicative of whether a line or trunk associated with a particular call is an ACH line or trunk, apparatus in the peripheral controller for transmitting a signal to the central control advising it of the existence of a seized line or trunk relating to a call; and for receiving in response from the central control a third signal indicative of the line or trunk being an ACH line or trunk if it is such a line or trunk and storing a signal relating to the third signal in the second RAM; for transmitting a signal to the central control indicative of a subscriber connected to the seized line or trunk hanging up; and for holding the signal line or trunk until receiving a release command signal from the central control.

BRIEF INTRODUCTION TO THE DRAWINGS

A better understanding of the invention will be obtained by reference to the detailed description below, in conjunction with the following drawings, in which:

FIG. 1 is a block diagram of a system including the invention.

DETAILED DESCRIPTION OF THE INVENTION

Figure 1:
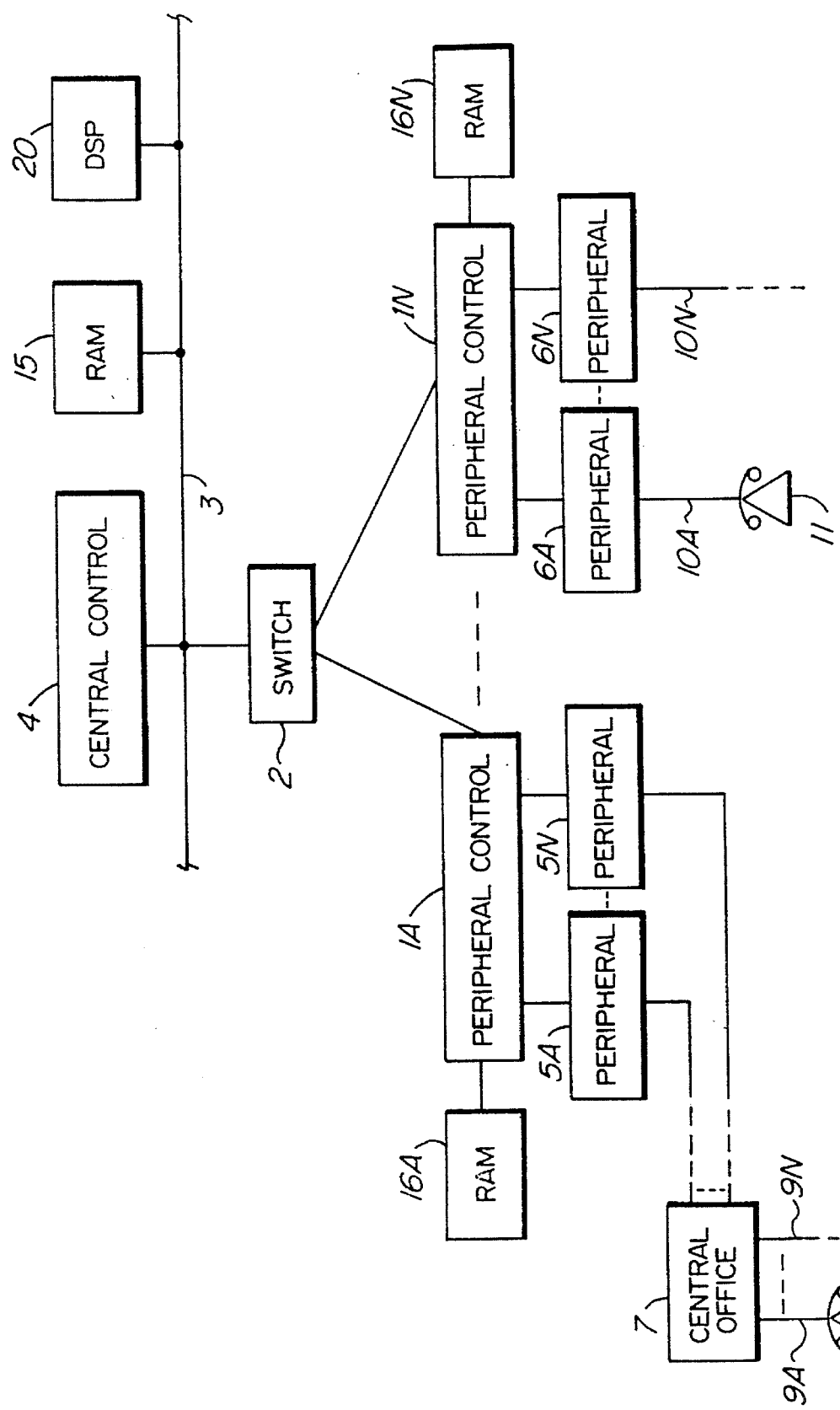

The telephone switching system is comprised of plural peripheral controllers 1A–1N which is connected to a telephone switch 2. The switch is connected to a bus 3 to which is connected a central control 4.

Lines and trunks 5A–5N, 6A–6N are connected to the peripheral controllers 1A–1N. In the representative case shown in FIG. 1, reference numerals 5A–5N represent miscellaneous incoming and outgoing analog and/or digital trunks, connected via trunks to a remote central office 7. Subscriber telephones 8 are connected via subscriber lines 9A–9N to central office 7.

Peripherals 6A–6N are shown as line circuits, connected to subscriber lines 10A–10N, to which a representative subscriber telephone 11 is connected.

It should be noted that switch 2 is merely a block diagram representation; it can represent a space division switch, a time division switch, and may be divided into message and circuit switches connected to the peripheral controllers 1A–1N, the particular form of switch and arrangement for connection to the peripheral controller it not critical to the invention. Systems or portions thereof which fulfill the requirements of the system just described may be found in U.S. Pat. No. 4,615,028 issued Sep. 30th, 1986, invented by Conrad Lewis et al, and U.S. Pat. No. 4,616,360 issued Oct. 10th, 1986 invented by Conrad Lewis. A system which fulfills the requirements of the above description is sold as SX-2000™ by Mitel Corporation. All of these are incorporated herein by reference.

Central control 4 controls the switch 2 and sends messages to the peripheral controllers 1A–1N, which in turn control peripherals 5A–5N and 6A–6N, in order to process calls between subscriber lines, between trunks and trunks, and between trunks and subscriber lines, in a well known manner, and as described in the aforenoted patents.

According to the present invention, however, certain of the lines or trunks are designated as abandoned call handling (ACH) lines or trunks.

In accordance with the present invention a separate random access memory 15, which may be a portion of an existing random access memory used by the central control 4, is connected to bus 3. Random access memory 15 maintains, as signals stored in the memory, a list of which lines and/or stored trunks are ACH trunks. Further, the memory retains, preferably associated with the aforenoted stored signals, a signal designative of whether a telephone line or trunk connected to an ACH line or trunk has hung up prior to the answering of a call by the local operator, or while on hold.

Each peripheral controller 1A–1N also has a random access memory 16A–16N for receiving signals from the central control 4 which designates whether the peripheral through which a call is being processed is designated as an ACH line or trunk. The peripheral control can maintain the line or trunk held. Therefore if the central control has informed it that a particular line or trunk is an ACH line or trunk, under circumstances to be described below, should the line or trunk terminate, the peripheral control accesses the stored data in RAM 16A–16N and maintains the line or trunk temporarily held.

In operation, assume that a subscriber requiring emergency service and utilizing telephone 8 dials 911. This call is routed through central office 7 to an incoming trunk 5A. When the peripheral control detects the origination of incoming trunk 5A, it sends a message to the central control 4 informing it of the origination on the trunk.

The central control accesses RAM 15 and determines that the incoming trunk 5A is an ACH trunk. It therefore sends a message to the peripheral control informing it that the call is incoming on an ACH trunk. The peripheral control as a result stores a signal in its associated RAM 16A concerning this fact.

The call is handled by the switching system in the normal manner, and ringing is applied to subscriber line 10A associated with an emergency call operator's telephone 11. The subscriber at telephone 8 hears ring back in the normal manner. Now without the ACH trunk, if subscriber 1 would hang up before the emergency operator at telephone 11 answers his telephone, trunk 5A would be released, and ringing to telephone 11 is stopped. The operator would never know the identity of the emergency calling line.

Now, however, since the peripheral control has stored a signal in RAM 16A that trunk 5A is an ACH trunk, when the subscriber at telephone 8 hangs up, the peripheral control does not release the trunk but instead sends a message to the main controller informing it that the caller that had been connected to the trunk 5A has disconnected. The main controller stores a signal corresponding to this information in RAM 15 preferably but not necessarily associated with the ACH designation of trunk 5A. The peripheral controller maintains trunk 5A held up. Ringing is continued to be sent to telephone 11.

When the emergency operator at telephone 11 answers his telephone, going off hook, the main controller preferably using a digital signal processor 20, causes a tone to be applied to the circuit to telephone 11, thus informing the emergency operator that a call has been made and has already disconnected. The central control 4 then sends a message to the peripheral control 1A, commanding it to release the trunk 5A.

It should be noted that rather than sending a tone to telephone 11, if the central office 7 has the facility of originating caller identification, it can send a signal via trunk 5A to the peripheral control 5A identifying the exact telephone number of the calling party. Thus even after the telephone caller at telephone 8 has hung up, its identification can be sent via switch 2 to telephone 11 which can display the calling number on a local display, not shown. Further, that number can be used to access a database stored in a memory, e.g. connected to bus 3, to telephone 11, etc., to identify the physical location of the calling party.

Thus even in an extreme emergency where the calling party has dialed 911 and has heard ringing, if his telephone has been hung up the emergency operator will be provided with an indication of where the emergency call has originated and police can be dispatched to the address.

In another circumstance, assume that a call is in process between a party at telephone 8 and emergency operator at telephone 11. If the party at telephone 8 is the calling party, designation of the ACH trunk 5A will be registered in RAM 16A as described above.

If the emergency operator at telephone 11 is the calling party, there is an outgoing call via outgoing trunk 5N. In this case when the subscriber at telephone 8 answers the call, the central control, having received an indication at the peripheral control that trunk 5N is being used, and having the stored information in RAM 15 that trunk 5N is an ACH trunk, the central control sends a message to the peripheral control 1A informing it that the trunk being used is an ACH trunk. The peripheral controller stores this information in RAM 16A as described above.

Now assume that the emergency operator at telephone 11 has placed the trunk 5N on hold (referred to herein as hard hold).

Without the above system, if the called party 8 hangs up, the trunk 5N would be released. However in the present case since the peripheral control has the stored indication that the trunk is an ACH trunk, it sends a message to the central control informing it that the caller at the far end of the trunk, i.e. at telephone 8, has disconnected. The main controller stores this information in RAM 15 in the manner described above.

When the emergency operator at telephone 11 attempts to release the trunk 5N from hold, the trunk 5N will still have been held up by peripheral control 1A due to its indication in RAM 16A that the trunk is an ACH trunk. In this case the central control preferably using digital signal processor 20, sends a message which can be a tone to telephone 11, which constitutes information that subscriber at telephone 8 has already disconnected. After sending the message, central control 4 then sends a controlling message to peripheral control 1A to release the trunk. In this manner the emergency operator at telephone 11 can determine that the party at telephone 8 has in fact hung up, rather than is merely silent.

It may be seen that the invention is not restricted for use with trunks being designated as ACH trunks, but may also be utilized with lines being designated as ACH lines, or with lines and trunks that may be intermixed and connected to a peripheral controller. The invention is also usable with any suitable telephone switching system, whether analog or digital.

A person understanding this invention may now conceive of alternative structures and embodiments or variations of the above. All of those which fall within the scope of the claims appended hereto are considered to be part of the present invention.

I claim:

1. A method of handling telephone calls comprising:
   (a) receiving a call in a telephone switching office from a first subscriber on an incoming line or trunk destined for a second subscriber, and completing the call to the second subscriber;
   (b) storing in a memory an indication signal signifying that the call has been received via a particular incoming line or trunk;
   (c) in case the first subscriber has hung up, accessing said memory and reading said indication signal, and as a result, sending a signal to the second subscriber which is indicative that the first subscriber has hung up;
   (d) automatically holding the incoming line or trunk after the first subscriber has hung up, and releasing the incoming line or trunk upon sending said indicative signal to said second subscriber that the first subscriber has hung up.

2. A method as defined in claim 1, including the step of holding the incoming line or trunk in the case in which the first subscriber has hung up prior to the second subscriber answering said call, and sending the indication signal after the second subscriber has answered the call.

3. A method as defined in claim 1, in which said indicative signal is a tone.

4. A method as defined in claim 1, in which said indicative signal is a message.

5. A method as defined in claim 4, in which said message includes an identification of the incoming line.

6. A method of handling telephone calls comprising:
   (a) receiving a call in a telephone switching office from a first subscriber on an incoming line or trunk destined for a second subscriber, and completing the call to the second subscriber;
   (b) storing in a memory an indication signal signifying that the call has been received via a particular incoming line or trunk;
   (c) in case the first subscriber has hung up after the second subscriber has answered the call, accessing said memory and reading said indication signal, and as a result, sending a signal to the second subscriber which is indicative that the first subscriber has hung up;
   (d) automatically holding the incoming line or trunk in the case in which the first subscriber has hung up prior to the second subscriber answering the call, and releasing the incoming line or trunk upon sending said indicative signal to said second subscriber that the first subscriber has hung up, after the second subscriber has answered the call;
   (e) holding the incoming line or trunk in the case in which the second subscriber has answered said call prior to the first subscriber hanging up, has placed the incoming line or trunk on hold, and has subsequently attempted to release the incoming line or trunk from hold after the first subscriber has hung up, and sending said indicative signal to the second subscriber indicative that the first subscriber has hung up after the incoming line or trunk has been attempted to be released from hold, and releasing said incoming line or trunk from hold only after the indicative signal has been sent.

7. A method of handling telephone calls comprising:
   (a) processing a call in a telephone switching office from a first subscriber on an incoming line or trunk destined for a second subscriber on an outgoing line or trunk, and ringing the second subscriber via the outgoing line or trunk;
   (b) storing an indication signal that the call has been received via a particular incoming line or trunk; and
   (c) automatically holding the particular incoming line or trunk in case the first subscriber has hung up prior to the second subscriber answering the call, continuing to ring the second subscriber, and once the second subscriber has answered the ringing, sending a signal to the second subscriber indicative that the first subscriber has hung up, and then releasing the incoming line or trunk.

8. A method of handling telephone calls comprising:
   (a) processing a call in a telephone switching office from a first subscriber on an incoming line or trunk destined for a second subscriber on an outgoing line or trunk, and completing the call to the second subscriber via the outgoing line or trunk;

(b) automatically holding the particular outgoing line or trunk in case the second subscriber has hung up, sending a signal to the first subscriber indicative that the second subscriber has hung up, and then releasing the outgoing line or trunk;

(c) automatically holding said particular outgoing line or trunk in the event the first subscriber has placed the outgoing line on hold and after the second subscriber has answered the call and the second subscriber has hung up while on hold, and then sending said indicative signal to said first subscriber after his attempt to release the outgoing line or trunk from hold, and releasing the outgoing line or trunk from hold upon said indicative signal having been sent.

9. A method as defined in claim 8, in which said indicative signal is a tone.

10. A method as defined in claim 8, in which said indicative signal is a message.

11. A method as defined in claim 10, in which said message includes an identification of the incoming line.

12. A telephone switching system comprising:

(a) at least one peripheral controller, (b) line and trunk circuits controlled by said peripheral controller, (c) a central control for controlling said system including controlling the peripheral controller and switching of signals between line circuits and between line and trunk circuits to enable calls to be made between lines and between lines and trunks, (d) a first random access memory (RAM) connected to the central control for storage of first signals indicative of predetermined lines and trunks designated as abandoned call handling (ACH) lines and trunks, and for storing associated signals indicative of the active state of the ACH lines and trunks, (e) a second random access memory (RAM) connected to each of said at least one peripheral controller for storage of second signals indicative of whether a line or trunk associated with a particular call is an ACH line or trunk, (f) means in said each of said at least one peripheral controller for transmitting a signal to said central control advising it of the existence of a seized line or trunk relating to a call; and for receiving in response from said central control a third signal indicative of the line or trunk being an ACH line or trunk, if it is such a line or trunk, and storing said second signal relating to said third signal in said second RAM; for transmitting a signal to the central control indicative of a subscriber connected to said seized line or trunk hanging up; and for holding said seized line or trunk until receiving a release command signal from the central control.

* * * * *